INVENTORS
Julien Mulders &
Pierre Godfrine

3,652,693
Patented Mar. 28, 1972

3,652,693
SELECTIVE PRODUCTION OF DICHLOROETHANE
Julien Mulders and Pierre Godfrine, Brussels, Belgium, assignors to Solvay & Cie., Brussels, Belgium
Filed July 21, 1967, Ser. No. 655,164
Claims priority, application France, July 22, 1966, 70,509; May 25, 1967, 107,820
Int. Cl. C07c *17/02*
U.S. Cl. 260—662 R                                           9 Claims

ABSTRACT OF THE DISCLOSURE

Process for selectively producing 1,2-dichloroethane by the chlorination of the ethylene present in a mixture with acetylene by bringing a gaseous mixture of acetylene, ethylene, chlorine and inert gaseous compounds acting as diluents, in which the molar ratio of chlorine to ethylene is about 1 and the molar ratio of acetylene to ethylene is less than 3, into the presence of a contact catalyst in a reaction zone at a temperature of between 85° and 200° C. for inducing a reaction in which 1,2-dichloroethane is produced from the ethylene, with a large proportion of the acetylene remaining unchanged.

BACKGROUND OF THE INVENTION

The present invention relates to the production of dichloroethane, and particularly to the production of this compound by the chlorination of a mixture of ethylene and acetylene and its employment in the production of vinyl chlorile.

It is known that it is possible to obtain 1,2-dichloroethane by reacting chlorine with gaseous mixtures containing ethylene diluted, for example, with methane, hydrogen, a carbon oxide, and nitrogen. The chlorination reaction can be carried out in the gaseous phase in the manner described in U.S. Pats. No. 2,099,231 and 2,658,088, for example, and it is possible to obtain in these particular cases a conversion of ethylene into dichloroethane with an efficiency of around 90%.

In those cases where the diluted ethylene mixture also contains recoverable quantities of acetylene, it has until now been considered preferable to treat this mixture with hydrogen chloride in order to form vinyl chloride, which is more easily separated than acetylene, as is shown in U.S. Pat. No. 2,858,347.

It is also known, for example from British Pat. No. 743,274, that, in effect, the chlorination in the gaseous phase of a mixture of acetylene and ethylene at 300° C. in the presence of activated charcoal leads to the formation of transdichloroethylene and of 1,2-dichloroethane. Although this process certainly permits the attainment of good efficiencies with regard to the amounts of ethylene and acetylene actually consumed, the rate of conversion of the total reaction ingredients present remains very limited. In addition, this process does not permit the selective chlorination of ethylene without at the same time chlorinating an appreciable quantity of the acetylene present in the mixture.

SUMMARY OF THE INVENTION

It is a primary object of the present invention to eliminate these shortcomings of the known processes.

Another object of the present invention is to improve the chlorination of ethylene present in a gaseous mixture with acetylene.

Yet another object of the present invention is to attain a true selective chlorination of the ethylene present in such a gaseous phase.

Briefly stated, the present invention involves a process which permits the selective chlorination, in the gaseous phase, of the ethylene present in a mixture containing a high percentage of acetylene without any substantial reaction of the acetylene with the chlorine and in such a manner that the acetylene is thus available at the output of the chlorination zone in the form of a constituent of a mixture containing 1,2-dichloroethane.

These and other objects according to the present invention are achieved by a novel process for selectively producing 1,2-dichloroethane by the chlorination of a mixture of ethylene and acetylene. The novel process is carried out by bringing the gaseous mixture of acetylene, ethylene, chlorine and inert gaseous ingredients acting as diluents, in which the molar ratio of chlorine to ethylene is about 1 and the molar ratio of acetylene to ethylene is less than 3, into the presence of a contact catalyst in a reaction zone, and subjecting such mixture to a reaction temperature of between 85° and 200° C. for inducing a reaction in which 1,2-dichloroethane is produced and a large proportion of the acetylene is unchanged.

It has been found that by varying the operative conditions within the limits defined above, it is possible to convert the ethylene contained in the reactive mixture into 1,2-dichloroethane with conversion efficiencies of the order of 98% without producing any notable transformation of the acetylene.

DESCRIPTION OF THE PREFERRED EMBODIMENTS

Figure 1:
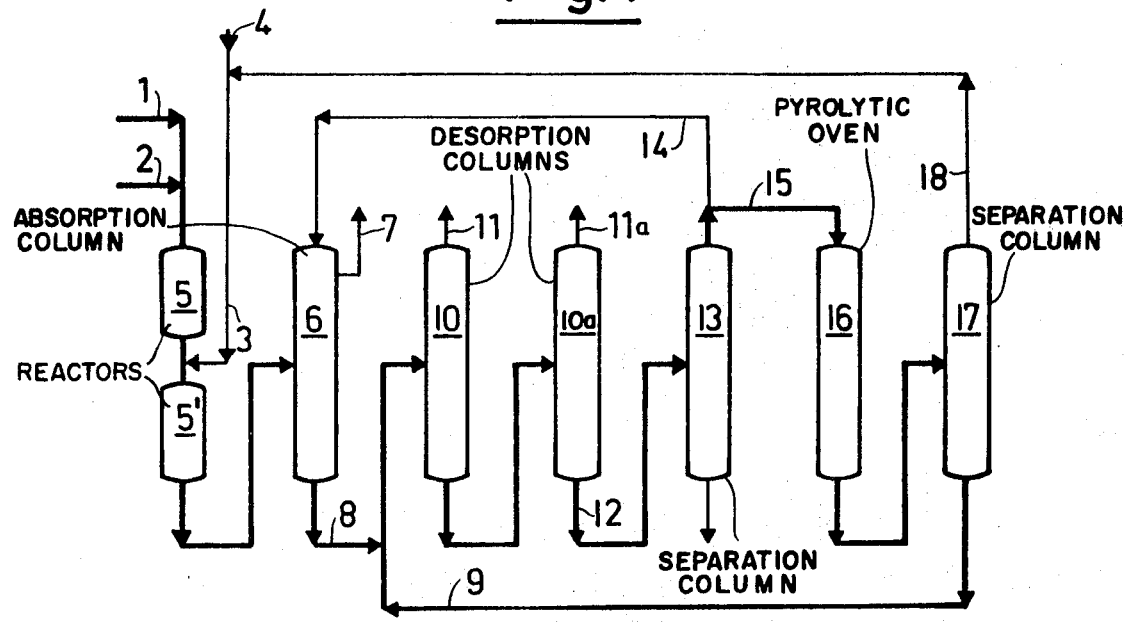
FIG. 1 is a block diagram showing one arrangement for carrying out the present invention.

As has been stated above, the reaction according to the present invention is to be carried out at a temperature of between 85° and 200° C. It has been found that the particular temperature employed is of substantial importance in obtaining the desired results according to the present invention and that the preferred temperature range is between about 90° and 130° C.

The ethylene and chlorine in the reactive mixture should have a chlorine/ethylene molar ratio of around 1. Applicants have been able to determine that, in addition to the particular reaction temperature employed, the particular acetylene/ethylene molar ratio employed has a marked influence on the efficiency with which 1,2-dichloroethane is produced by the selective chlorination of the ethylene in the ethylene-acetylene mixture present in the gaseous phase. In effect, this 1,2-dichloroethane production efficiency diminishes when the ratio increases. It is for this reason that, according to the present invention, the molar ratio of acetylene to ethylene is maintained at a value of less than 3 in the reactive mixture.

The inert gaseous compounds acting as diluents can be introduced together with the hydrocarbons to be treated. This is particularly desirable when the mixtures of acetylene and ethylene employed are derived from the acetylenic cracking of hydrocarbons, such as ethane, propane, butane, or even petroleum fractions, such as light naphtha. After the usual separation of the carbon and the tars, and possibly of the carbonic gas, the resulting gaseous mixture can be treated in such a manner as to eliminate the higher acetylenic derivatives and the hydrocarbons whose molecules contain more than 3 carbon atoms, for example, by selective hydrogenation or prechlorination. The resulting gaseous mixture would then contain a 20% to 30% concentration of a mixture of ethylene and acetylene diluted by residual gases, such as hydrogen, methane, and carbon oxides and it is this gaseous mixture which is utilized as one of the starting materials of the process according to the present invention.

The diluting agents could also be introduced with the chlorine. Thus, according to the present invention, it would be possible to utilize diluted chlorine produced by the oxidation of hydrogen chloride.

The chlorination reaction is effectuated in the presence of a contact catalyst. Such contact catalyst can be constituted, in particular, by silica, alumina, kieselgur (diatomaceous earth), or one of the natural or synthetic silico aluminates, particularly the lamellar silico aluminates analogous to bentonite. To cite one specific example, it has been found to be advantageous to utilize granules obtained by the agglomeration and firing of kieselgur and bentonite, this particular contact catalyst permitting the attainment of chlorine conversion efficiencies of the order of 100% without any accompanying increase in the degree of chlorination of the acetylene.

These granules may be obtained according to any process well known for one skilled in the art; for example by kneading of kieselgur and bentonite, with water and in the presence of a binder such as caustic potash, breaking up of the lumps, granulating, drying, calcining at high temperatures (700–800° C.) and then screening.

When silica is employed as the catalyst and a sufficiently high temperature is maintained, for example, a temperature of at least 175° C., it has been observed that a reaction of all of the chlorine can be effectuated by sustaining the reaction for 30 to 60 seconds. At the lower portion of the temperature range, it is desirable to employ a longer reaction time.

Regardless of the conditions employed, it has been found that it is not necessary to prolong the time during which the reactive mixture remains in the reaction zone beyond 60 seconds. This period will evidently vary as a function of the degree of dilution of the reactive ingredients and possibly also as a function of the pressure. In those cases where less active catalysts, such a pumice stone, are used, a longer contact time must be employed in order to obtain complete transformation of the chlorine, but the selectivity of the chlorination of the ethylene will remain very high.

Good results have been obtained when the chlorination reaction is carried out at atmospheric pressure. However, it may be desirable to carry out the reaction at a pressure above atmospheric, particularly when the quantity of inert diluents present in the reaction zone becomes too great to permit the reaction to proceed at a satisfactory rate under atmospheric pressure. As a general rule, if the reaction is carried out at a pressure greater than atmospheric, it is easily possible to equal or, at the least to approach very closely, a degree of selectivity in the reaction of the chlorine with the ethylene of the order of 100%.

The upper pressure limit, whcih depends essentially on the concentration of the acetylene in the mixture, should be such that the partial pressure of the acetylene remains less than 1.2 kg./cm.$^2$ in order to avoid any risk of degradation of this compound. For example, when the reactive mixture contains around 10%, by volume, of acetylene, the pressure under which the reaction is carried out can be selected within a range of 1 to 10 atmospheres.

In this manner, the rate of fixation of the chlorine on the acetylene, which is of the order of 2 to 4% at atmospheric pressure, can be brought to zero, or at the most to 0.5%, when the reaction is carried out at a pressure of 2.5 atmospheres, as is shown in Examples 8, 9 and 10 set forth below.

The mixture of 1,2-dichloroethane and acetylene which is obtained could advantageously be conducted into another reaction zone into which is also introduced a quantity of hydrogen chloride which corresponds stoichiometrically to the quantity of acetylene present in the mixture. This second reaction zone, which contains a usual catalyst for synthesizing vinyl chloride, is generally maintained at a temperature of around 100° to 150° C.

The second reaction zone could be constituted by a tubular reactor following the reactor in which the selective chlorination of the ethylene takes place.

It is also possible to dispose the catalyst for the synthesis of vinyl chloride following the contact catalyst for the selective chlorination, the two reactions described above then occurring successively in the same unit. In the two cases, the chlorination products produced by the first reaction can pass in their then-existing form to the second, hydrochlorination, stage without it being necessary to separate one or the other of them.

In order to illustrate the present invention in greater detail, there will now be described nine specific examples of the selective chlorination of the ethylene contained in a mixture which also contains acetylene. In addition, one example will be given for a mixture of acetylene and 1,2-dichloroethane thus obtained according to the present invention and subsequently submitted to a hydrochlorination reaction in such a manner as to obtain a gaseous mixture containing vinyl chloride and 1,2-dichloroethane.

Table I sets forth the pertinent data relative to the processes representing Examples 1 to 5 according to the present invention. The reactions were carried out in a vertical reactor constituted by a steel tube having an interior diameter of 51 mm. and a length of 1.445 meters and surrounded by a double envelope for the circulation of a mass of oil whose temperature is thermostatically controlled. Within this reactor are disposed either granules of silica gel or granules of pumice stone. An assembly of thermocouples placed in an axial sheath having an exterior diameter of 14 mm. permits the temperatures at various levels of the reactor to be measured. An analogous reactor is described in French Pat. No. 1,295,387.

In each of Examples 1 to 5, the reaction is carried out at a pressure of 1 atmosphere. The reactive mixture is initially constituted by acetylene, ethylene, chlorine, hydrogen and nitrogen in the proportions indicated in Table I, this table also setting forth the results of a chromatographic analysis of the outflowing products.

TABLE I

| Operating conditions | Example | | | | |
|---|---|---|---|---|---|
| | 1 | 2 | 3 | 4 | 5 |
| Temperature, °C | 100 | 175 | 175 | 100 | 100 |
| Time during which mixture remains in reactor, sec | 50 | 50 | 30 | 100 | 50 |
| Composition of contact catalyst | (¹) | (¹) | (¹) | (²) | (¹) |
| Flow rates of ingredients of reactive gaseous mixture introduced, l./h. at STP: | | | | | |
| Ethylene | 5.33 | 4.43 | 7.39 | 5.33 | 3.68 |
| Acetylene | 5.33 | 4.43 | 7.39 | 5.33 | 7.37 |
| Chlorine | 5.33 | 4.43 | 7.39 | 5.33 | 3.68 |
| Hydrogen | 17.76 | 14.78 | 24.64 | 17.76 | 18.41 |
| Nitrogen | 15.92 | 13.30 | 22.17 | 15.98 | 16.57 |
| Molar ratio of $C_2H_2/C_2H_4$ | 1 | 1 | 1 | 1 | 2 |
| Efficiency of chlorine conversion, percent | 98.5 | 100 | 99.8 | 87 | 100 |
| Efficiency of conversion of chlorine into 1,2-dichloroethane, percent | 96 | 85.7 | 87.4 | 80.4 | 92 |
| Efficiency of conversion of acetylene into 1,2-transdichloroethylene, percent | 1.8 | 5.9 | 6.2 | 4.5 | 4 |
| 1,2-dichloroethane yield in proportion to the amount of chlorine consumed, percent | 97.5 | 85.7 | 87.6 | 92.4 | 92 |

¹ Silica gel 1–3 mm.   ² Pumice stone.

The data set forth in Table I clearly show the high selectivity of the 1,2-dichloroethane production process. The yield of this product, calculated with respect to the chlorine consumed, was superior to 90% and could attain a value of 97.5% at optimum temperatures. Moreover, the effects of the temperature employed and of the acetylene/ethylene ratio on the selectivity of the chlorination reaction become readily apparent from a comparison of the results of Example 1 with those of Examples 3 and 5. These tests, effected with $C_2H_2/C_2H_4$ molar ratios of greater than 3, evidence, however, the formation of unduly large quantities of products of the combination of chlorine and acetylene.

Example 6

Two liters of granules of activated charcoal impregnated with $HgCl_2$ (5%, by weight, of Hg) are disposed in a reactor similar to the one utilized from the processes of Examples 1 to 5. The temperature being maintained at 150° C., there is introduced, at an hourly rate, a gaseous mixture produced by the process according to the present invention and composed of 3.8 liters of 1,2-dichloroethane, 3.9 liters of acetylene, and 24.5 liters of inert gases (all measured at STP) to which is added a volume of hydrogen chloride equal to that of the acetylene. A chromatographic analysis of the outflowing gas shows that the conversion of the acetylene into vinyl chloride is practically complete.

Table II, below, sets forth the corresponding data for the processes constituting Examples 7 to 10.

For the process of Example 7, a reactor identical with that described above in connection with Examples 1 to 5 was used and was provided with a catalyst constituted by granules obtained by the agglomeration and firing of kieselgur and bentonite.

The processes of Examples 8, 9 and 10 were carried out in a reactor constituted by a steel tube having an internal diameter of 27 mm. and a length of 2.7 meters, the reactor being thermostatically controlled in the same manner as the reactor described above. The catalyst used was constituted by granules of silica gel or of a mixture of kieselgur and bentonite. The temperature within the reactor was measured by thermocouples placed in an axial sheath having an external diameter of 10 mm. For the processes of Examples 8, 9 and 10, the total pressure in the reactor was 2.5 atmospheres.

For each of Examples 7 to 10, Table II sets forth the quantities of the ingredients of the reactive mixture introduced into the reactor as well as the temperature and pressure conditions and the time period during which the reaction proceeded. A chromatographic analysis of the gases leaving the reactor permitted a determination of the efficiencies of conversion of the chlorine and acetylene, as well as the yield of 1,2-dichloroethane with respect to the amount of chlorine consumed.

TABLE II

| Operating conditions | Example | | | |
|---|---|---|---|---|
| | 7 | 8 | 9 | 10 |
| Temperature, °C | 125 | 135 | 190 | 120 |
| Time during which mixture remains in reactor, sec | 178 | 8 | 8 | 8 |
| Pressure, atmospheres | 1 | 2.5 | 2.5 | 2.5 |
| Composition of contract catalyst | (1) | (1) | (1) | (2) |
| Flow rates of ingredients of reactive gaseous mixtures introduced, l./h. at STP: | | | | |
| Ethylene | 2 | 92 | 92 | 92 |
| Acetylene | 2 | 92 | 92 | 92 |
| Chlorine | 2 | 92 | 92 | 92 |
| Hydrogen | 0 | 307 | 0 | 307 |
| Nitrogen | 12.9 | 278 | 585 | 278 |
| Molar ratio of $C_4H_2/C_2H_4$ | 1 | 1 | 1 | 1 |
| $Cl_2$ conversion efficiency, mole percent | 100 | 93.3 | 95.5 | 98.5 |
| Efficiency of conversion of $Cl_2$ into 1,2-$C_2H_4Cl_2$, mole percent | 94 | 92.9 | 94.2 | 98.5 |
| Efficiency of conversion of $C_2H_2$ into $C_2H_2Cl_2$, mole percent | 1.3 | 0.08 | 0.48 | 0 |
| 1,2-$C_2H_4Cl_2$ yield in proportion to the amount of $Cl_2$ consumed, mole percent | 94 | 99.6 | 98.7 | 100 |

1 Kieselgur plus bentonite. 2 Silica gel.

The selectivity evidenced by the results of the processes of Examples 8, 9 and 10 is seen to be clearly superior to that obtained when a pressure of 1 atmosphere is maintained in the reactor. This improvement appears even more clearly from a comparison of the results of Examples 7, 8 and 9. It is evident, on the other hand, that this selectivity varies only slightly with variations in the total chlorine conversion efficiencies. In this connection, Example 7, the process for which was carried out under atmospheric pressure, shows that for long reaction times the amount of fixation of the chlorine on the acetylene remains small when granules of kieselguhr and bentonite are employed as the catalyst.

Referring now to the drawings, there are shown two systems for carrying out the process according to the present invention and for obtaining vinyl chloride as the final product.

In the arrangement of FIG. 1, diluted gas containing acetylene and ethylene is introduced via line 1, chlorine is introduced via line 2 and HCl is introduced via line 3. A possible auxiliary supply of HCl can be introduced via line 4. The diluted gas mixture and the chlorine are fed into the reactor 5 and the gaseous products flowing out of reactor 5 are mixed with the HCl introduced via line 3 before passing into the hydrochlorination reactor 5'. The reactors 5 and 5' can be constituted by two separate units each similar to those described above in connection with the examples. Alternatively, as also described above, the two reactors could be constituted by a single device having two successive reaction zones in the first of which the 1,2-dichloroethane is produced and in the second of which the vinyl chloride is produced.

The reaction in reactor 5' produces a gaseous mixture containing, particularly, vinyl chloride, 1,2-dichloroethane and inert gases, which mixture is fed to an absorption column 6 where the inert gases are separated and led off via line 7, while a liquid phase having a base of 1,2-dichloroethane and vinyl chloride is created by absorption in 1,2-dichloroethane delivered from separation column 13 by way of line 14. This liquid phase leaves absorption column 6 via line 8.

The mixture flowing through line 8 is received by the conduit 9 conducting the vinyl chloride and the 1,2-dichloroethane from the base of separation column 17. The resultant mixture in conduit 9 is delivered to desorption column 10 in which the vinyl chloride is desorbed and flows off via line 11 while the remaining products are fed to a second desorption column 10a in which the lighter products are desorbed and escape via line 11a.

The remaining products flow to the base of column 10a and from there flow off via line 12 to separation column 13. In this column, 1,2-dichloroethane is separated from the heavier residual products, the separated 1,2-dichloroethane exiting at the top of column 13, with one portion of the 1,2-dichloroethane being led via conduit 14 to the absorption column 6 and the other portion thereof being led via line 15 to a pyrolytic oven 16 where it undergoes a pyrolysis treatment. The heavier residual products remaining in column 13 are fed off via the base thereof.

The treated material flowing out of oven 16 is fed to separation column 17 in which hydrogen chloride is separated from the vinyl chloride and the 1,2-dichloroethane. The hydrogen chloride exits from the top of separation column 17 and is fed via line 18 to line 3, while the vinyl chloride and 1,2-dichloroethane exit via the base of column 17 and are fed through line 9 to the input of the vinyl chloride desorption column 10.

All of the pieces of apparatus represented in FIG. 1 can be constituted by well-known, commercially available processing units.

Figure 2:
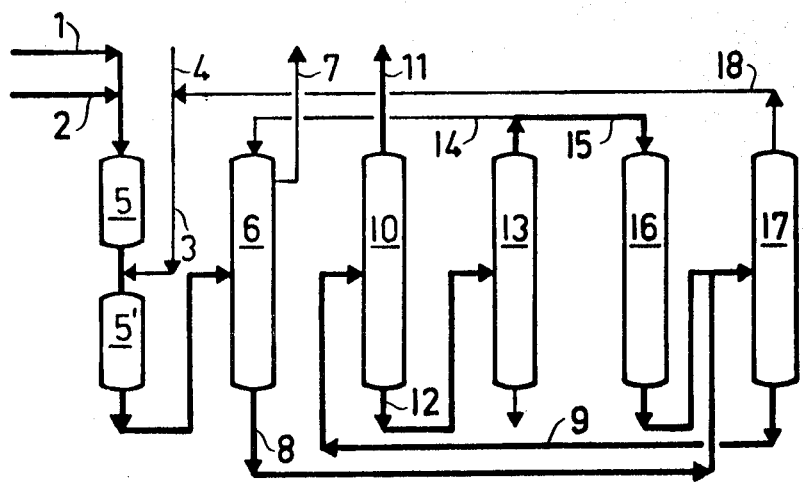
FIG. 2 is a view similar to that of FIG. 1 of a modified arrangement for carrying out the present invention.

FIG. 2 shows a modified version of the processing system which differs from that of FIG. 1 only in that the organic products appearing at the base of absorption column 6 are fed to the separation column 17 together with the output from the pyrolytic oven 16 so that the vinyl chloride desorption column 10 receives its total input from but a single source, i.e., the base of column 17.

It will be understood that the above description of the present invention is susceptible to various modifications, changes and adaptations, and the same are intended to be comprehended within the meaning and range of equivalents of the appended claims.

We claim:
1. A process for producing 1,2-dichloroethane from a gaseous mixture of ethylene, acetylene, chlorine and inert gaseous diluent which comprises contacting the gaseous mixture with a contact catalyst at a temperature of between 85° and 200° C., the molar ratio of acetylene to ethylene in said gaseous mixture being less than 3, the molar ratio of chlorine to ethylene in said gaseous mixture being about 1, and the contact catalyst being a member selected from the group consisting of silica, alumina, and silico-aluminates, whereby the ethylene in said gaseous mixture is selectively chlorinated.

2. A process as defined in claim 1 wherein at least part of the inert gaseous diluent is introduced together with the ethylene-acetylene mixture.

3. A process as defined in claim 1 wherein at least part of the inert gaseous diluent is introduced into the gaseous mixture together with the chlorine.

4. A process as defined in claim 1 wherein the catalyst is silica in the form of silica gel.

5. A process as defined in claim 4 wherein the reaction temperature is between about 90° and 130° C.

6. A process as defined in claim 1 wherein the catalyst is a silico-aluminate.

7. A process as defined in claim 6 wherein the catalyst is constituted by granules obtained by the agglomeration and firing of a mixture of kieselgur and bentonite.

8. A process as defined in claim 1 wherein the gaseous mixture is maintained at a pressure which is greater than 1 atmosphere but less than that at which the partial pressure of the acetylene in the gaseous mixture is 1.2 atmospheres.

9. A process as defined in claim 1 wherein the ethylene and acetylene of the gaseous mixture are derived in dilute form from a hydrocarbon cracking process.

References Cited
UNITED STATES PATENTS

| | | | |
|---|---|---|---|
| 2,099,231 | 11/1937 | Ruys et al. | 260—662 |
| 2,374,933 | 5/1945 | Harding | 260—662 X |
| 2,520,712 | 8/1950 | Cheney | 260—662 |
| 2,658,088 | 11/1953 | Landau et al. | 260—662 |
| 2,730,555 | 1/1956 | Rosenstein | 260—656 |
| 2,858,347 | 10/1958 | Hutchings | 260—656 |

FOREIGN PATENTS

| | | | |
|---|---|---|---|
| 603,099 | 6/1948 | Great Britain | 260—656 |
| 743,274 | 6/1953 | Great Britain | 260—654 |
| 857,087 | 12/1960 | Great Britain | 260—656 |
| 954,791 | 4/1964 | Great Britain | 260—656 |

OTHER REFERENCES

Groggins, Unit Processes in Organic Synthesis, 5th Ed., McGraw-Hill (1958), QD262 G7 1958 c. 6.

LEON ZITVER, Primary Examiner

J. A. BOSKA, Assistant Examiner

U.S. Cl. X.R.

260—656 AC